United States Patent
Sandre et al.

(10) Patent No.: US 12,008,618 B2
(45) Date of Patent: Jun. 11, 2024

(54) SYSTEM AND METHOD FOR AN AUGMENTED REALITY TAG VIEWER

(71) Applicant: Wiliot, Ltd., Caesarea (IL)

(72) Inventors: Roberto Sandre, San Diego, CA (US); Stephen Statler, San Diego, CA (US); Tal Tamir, Even Yehuda (IL); Yaroslav Ross, San Diego, CA (US)

(73) Assignee: Wiliot, Ltd., Caesarea (IL)

( * ) Notice: Subject to any disclaimer, the term of this patent is extended or adjusted under 35 U.S.C. 154(b) by 42 days.

(21) Appl. No.: 17/368,349

(22) Filed: Jul. 6, 2021

(65) Prior Publication Data

US 2022/0004764 A1 Jan. 6, 2022

Related U.S. Application Data

(60) Provisional application No. 63/048,443, filed on Jul. 6, 2020.

(51) Int. Cl.
| | |
|---|---|
| *G06Q 30/0601* | (2023.01) |
| *G06F 18/22* | (2023.01) |
| *G06T 11/00* | (2006.01) |
| *G06V 10/25* | (2022.01) |
| *G06V 20/20* | (2022.01) |
| *H04W 4/80* | (2018.01) |

(52) U.S. Cl.
CPC ......... *G06Q 30/0623* (2013.01); *G06F 18/22* (2023.01); *G06T 11/00* (2013.01); *G06V 10/25* (2022.01); *G06V 20/20* (2022.01); *H04W 4/80* (2018.02)

(58) Field of Classification Search
CPC ...... G06V 20/20; G06V 10/25; G06K 9/6201; G06Q 30/0623; G06T 11/00; G06T 11/60; H04W 4/80; H04W 4/20
See application file for complete search history.

(56) References Cited

U.S. PATENT DOCUMENTS

| | | | | |
|---|---|---|---|---|
| 9,154,695 | B2* | 10/2015 | Boncyk | G06Q 90/00 |
| 9,424,598 | B1* | 8/2016 | Kraft | G06V 10/44 |
| 9,603,013 | B2* | 3/2017 | Niewczas | H04W 12/04 |
| 9,955,297 | B2* | 4/2018 | Kostka | G06Q 30/0267 |
| 10,223,454 | B2 | 3/2019 | Folkens et al. | |
| 10,250,948 | B1* | 4/2019 | Bortz | H04B 10/60 |
| 10,282,776 | B2* | 5/2019 | Jo | H04N 23/63 |

(Continued)

OTHER PUBLICATIONS

CamFind. "A New Understanding of Visual Search" Accessed Jul. 6, 2021. https://camfindapp.com/.

*Primary Examiner* — Motilewa Good-Johnson
(74) *Attorney, Agent, or Firm* — M&B IP Analysts, LLC

(57) ABSTRACT

A system and method for method for providing an augmented reality tag viewer are provided. The method includes receiving, by a device, a low-energy encrypted beacon from a tag attached to a product, the beacon uniquely identifies the product; retrieving information about the product identified by the received beacon; determining if the product is present in a field of view of a camera of the device; upon determining that the identified product is present in the field of view of the camera, matching the product in the field of view with the retrieved information; and upon determining that the product in the field of view matches the retrieved information, overlaying an interface over the display to highlight the product.

21 Claims, 5 Drawing Sheets

(56) References Cited

U.S. PATENT DOCUMENTS

| | | | |
|---|---|---|---|
| 10,304,011 B2* | 5/2019 | Park | G06Q 10/02 |
| 10,571,547 B2* | 2/2020 | Oh | G01S 5/0242 |
| 10,726,267 B1* | 7/2020 | Lamont | G06F 21/44 |
| 10,747,968 B2 | 8/2020 | Espinosa | |
| 10,755,061 B1* | 8/2020 | Monroy-Hernández | G06K 7/1413 |
| 10,834,200 B2* | 11/2020 | Cambridge | H04L 63/123 |
| 10,984,243 B2* | 4/2021 | Lamont | G06F 3/011 |
| 11,094,124 B1* | 8/2021 | Schweinfurth | G16H 40/20 |
| 11,257,337 B2* | 2/2022 | Tyler | H04W 52/0254 |
| 11,295,592 B2* | 4/2022 | Shakedd | H02J 7/345 |
| 11,398,144 B2* | 7/2022 | Shakedd | G06Q 20/389 |
| 11,494,569 B2 | 11/2022 | Espinosa | |
| 2006/0038833 A1* | 2/2006 | Mallinson | A63F 13/52 345/633 |
| 2010/0097221 A1* | 4/2010 | Kreiner | G06K 7/10079 340/572.1 |
| 2013/0260797 A1* | 10/2013 | Jones | H04W 4/02 455/456.3 |
| 2015/0178643 A1* | 6/2015 | Park | G06Q 10/02 705/5 |
| 2015/0220786 A1 | 8/2015 | Folkens et al. | |
| 2015/0220787 A1 | 8/2015 | Folkens et al. | |
| 2015/0220802 A1 | 8/2015 | Mazur et al. | |
| 2015/0257104 A1* | 9/2015 | Choi | H04W 52/0229 455/41.3 |
| 2016/0012079 A9 | 1/2016 | Folkens et al. | |
| 2016/0050219 A1* | 2/2016 | Niewczas | H04W 12/10 726/5 |
| 2016/0127875 A1* | 5/2016 | Zampini, II | G01S 5/0226 370/311 |
| 2016/0171486 A1* | 6/2016 | Wagner | G06Q 20/326 705/39 |
| 2016/0342624 A1 | 11/2016 | Mazur et al. | |
| 2017/0131994 A1* | 5/2017 | Middleton | H04W 4/80 |
| 2017/0164142 A1* | 6/2017 | Rykowski | H04W 12/06 |
| 2018/0024362 A1* | 1/2018 | Williamson | G06T 19/006 345/428 |
| 2018/0249735 A1 | 9/2018 | Espinosa | |
| 2019/0098445 A1* | 3/2019 | Hu | H04W 12/50 |
| 2020/0084619 A1* | 3/2020 | Peitz | H04W 12/037 |
| 2020/0151403 A1* | 5/2020 | Forster | G06K 7/10297 |
| 2020/0218899 A1* | 7/2020 | Lamont | G06T 7/74 |
| 2020/0296671 A1* | 9/2020 | Bhattacharyya | H04W 80/02 |
| 2020/0349328 A1 | 11/2020 | Espinosa | |
| 2020/0356777 A1* | 11/2020 | Lamont | G06F 3/011 |
| 2020/0364525 A1* | 11/2020 | Mats | G06K 19/0717 |
| 2020/0410769 A1* | 12/2020 | Lee | G06F 3/017 |
| 2021/0020011 A1* | 1/2021 | Shakedd | G06Q 20/389 |
| 2021/0027595 A1* | 1/2021 | Shakedd | G06F 16/9535 |
| 2021/0073295 A1* | 3/2021 | Joyce | G06F 16/41 |
| 2021/0174087 A1* | 6/2021 | Srikanth | G06V 20/647 |
| 2022/0284447 A1* | 9/2022 | Bulawski | G06K 19/07758 |

\* cited by examiner

SYSTEM AND METHOD FOR AN AUGMENTED REALITY TAG VIEWER

CROSS-REFERENCE TO RELATED APPLICATIONS

This application claims the benefit of U.S. Provisional Application No. 63/048,443 filed Jul. 6, 2020, the contents of which are hereby incorporated by reference.

TECHNICAL FIELD

The present disclosure relates generally to an augment reality view, and more specifically, the disclosure relates to a system and method for operating low-energy wireless augmented reality viewer.

BACKGROUND

Computerized applications that enable physical product identification and discovery rely today mainly on computer vision, in which the computer analyzes captured images and identify what the image includes. This requires a massive amount of image scraping, which involve searching a website for image content, and labelling of the images found. As such the process is inefficient, and gives access only to a limited information, like the shape and color of a physical object, without enabling a rich and accurate data set (e.g., product manufacturer, country of origin, etc.).

Also, web browsers in the market enable smartphones to receive non-private URLs broadcast from tracking tags or beacons using among other things Bluetooth® as a transport layer. However, the user interface is limited by being entirely textual, and uncorrelated with the visual space of the users.

Additionally, smartphones may receive a stream of all URLs emitted from tracking tags that are in range, without the ability for users to the URLs based only on what is in the visual space context, thus resulting in a subpar user experience.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for providing an augmented reality tag viewer. The method comprises receiving, by a device, a low-energy encrypted beacon from a tag attached to a product, the beacon uniquely identifies the product; retrieving information about the product identified by the received beacon; determining if the product is present in a field of view of a camera of the device; upon determining that the identified product is present in the field of view of the camera, matching the product in the field of view with the retrieved information; and upon determining that the product in the field of view matches the retrieved information, overlaying an interface over the display to highlight the product Certain embodiments disclosed herein further includes a system for providing an augmented reality tag viewer. The system comprises a processing circuitry; and a memory, the memory containing instructions that, when executed by the processing circuitry, configure the system to: augmented reality tag viewer, comprising: receive, by a device, a low-energy encrypted beacon from a tag attached to a product, the beacon uniquely identifies the product; retrieve information about the product identified by the received beacon; determine if the product is present in a field of view of a camera of the device; upon determination that the identified product is present in the field of view of the camera, match the product in the field of view with the retrieved information; and upon determination that the product in the field of view matches the retrieved information, overlaying an interface over the display to highlight the product.

BRIEF DESCRIPTION OF THE DRAWINGS

The subject matter disclosed herein is particularly pointed out and distinctly claimed in the claims at the conclusion of the specification. The foregoing and other objects, features and advantages of the disclosure will be apparent from the following detailed description taken in conjunction with the accompanying drawings.

DETAILED DESCRIPTION

Figure 1:
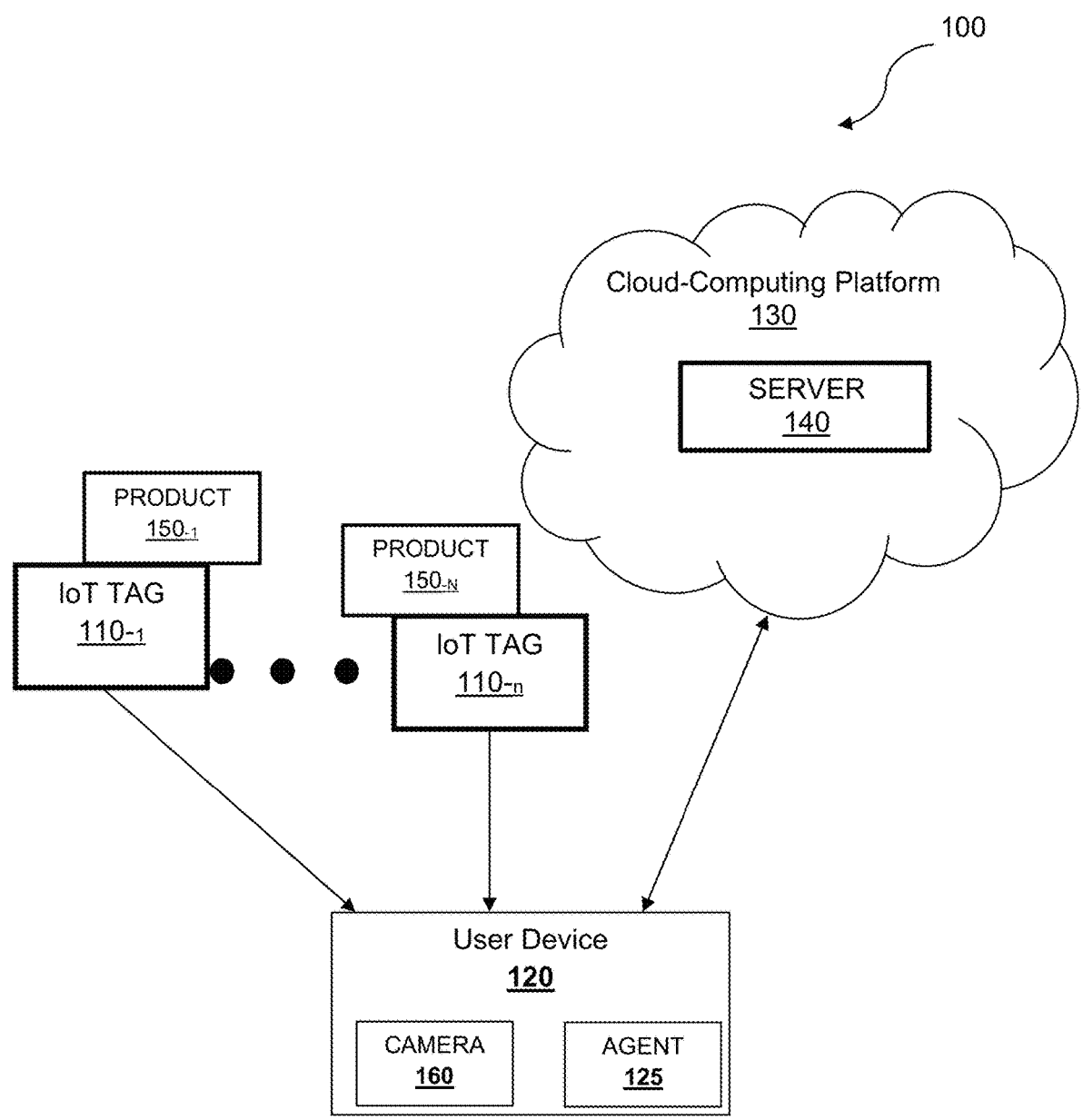
FIG. 1 is a schematic diagram of a wireless low-energy augmented reality viewing system utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a system and method that use a combination of computer vision and passive tags with automatic Identification (ID) technologies to securely identify and discover information of physical products in a visual space, using a camera-enabled application as an augmented-reality browsing device. The discovered information may include product details, store availability and so on. In a preferred embodiment, the passive tag is a battery-free IoT tag that communicates over low-power communication protocols. An example for such protocols include Bluetooth Low Energy (BLE).

Figure 4:
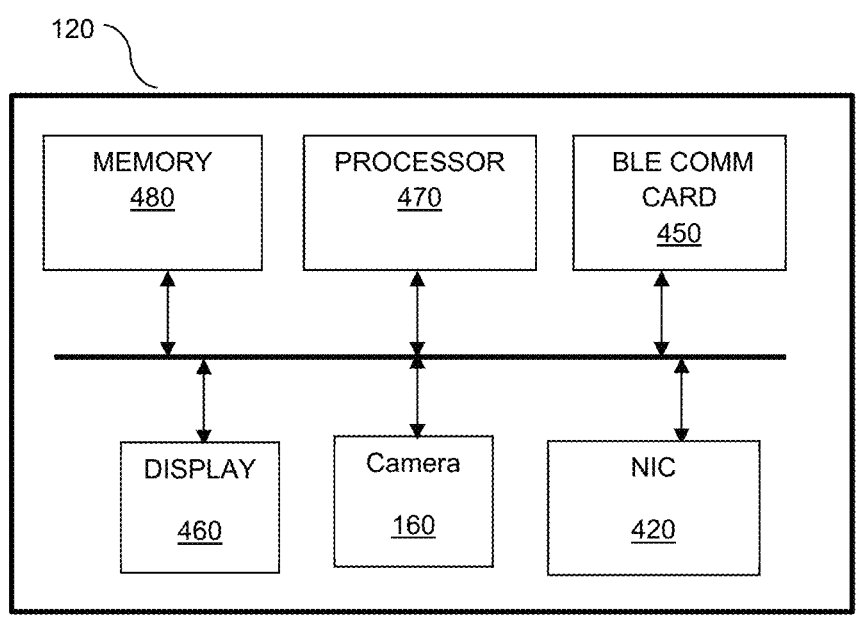
FIG. 4 is a schematic diagram of the user device according to an embodiment.

FIG. 1 is an example of a low energy augmented reality viewing system 100 utilized to describe the various embodiments. The system 100 includes a plurality of IoT tag 110-1 through 110-n (collectively referred to as an IoT tag 110 or IoT tags 110), a user device 120, and a cloud computing platform 130. The system 100 also includes at least one server 140 that may be deployed in the cloud computing platform 130. Each IoT tag 110 is respectively attached to one of a plurality of products 150-1 through 150-n. Further, the user device 120 includes a camera 160. The server 140 may be realized as a physical machine, a virtual machine, and the like. An example diagram of the server 140 is shown in FIG. 4.

In a preferred embodiment, the IoT tag 110 may be an Internet of Things (IoT) tag that is attached to the product 150 to drive contextual search for information on the product 150. In another embodiment, the IoT tag 110 is a battery-free IoT tag 110. Communication among the IoT tag 110 and the user device 120 may be performed using a low-energy communication protocol. The communication between the cloud computing platform 130 and the user device 120 is over, for example, the Internet.

In an example embodiment, the low-energy communication protocol includes a Bluetooth Low Energy (BLE) protocol, which are short-wavelength radio waves operating at a range of about 2.40 MHz to 2.485 MHz, and commonly used among portable wireless devices. The tag 110 may be realized using other automatic Identification (ID) technologies, such as QR code, NFC, UHF RFID, and the like.

The cloud computing platform 130 may include a public cloud, a private cloud, a hybrid cloud, or combination thereof. The user device 120 may be, but is not limited to, for example, a personal computer, a laptop, a tablet computer, a smartphone, a wearable computing device, or any other device capable of bridging between at least two different communication protocol, (e.g., the BLE and HTTP). The user device 120 may also communicate with a network (other than BLE networks), such networks include local area network (e.g., Wi-Fi), the Internet, and the like.

The camera 160 located on the user device 120 may include a camera that captures images within its Field of View (FOV). The image captured within the FOV of the camera 160 may then be displayed on the display 460 of the user device 120. In an embodiment, the imaging device 160 and the display 460 may be located separately from the user device 120.

In an embodiment, the IoT tags 110, each having a unique identity, sense a particular RF activity relative to each other at a certain coordinate location. When a product 150 is placed proximate one of the IoT tags 110 (e.g., IoT tag 110-1) an interference to the ambient RF field caused difference between the electrical properties of the material or the temperature of the product 150 and that of the ambient surroundings (e.g., air) leads to a change in an RF value detected by the IoT tag 110-1 as a pick-up (i.e., interference) event. As will be explained in more detail below, the IoT tag 110-1 sends the detected anomaly along with other information to the user device 120 via a Protocol Data Unit (PDU) frame (i.e., an Advertising PDU if using Bluetooth LE Advertising Channel). The user device 120 relays the combined information to the server 140, which performs further processing to identify the product 150 and search for more information regarding the product 150.

In an embodiment, a data packet includes at least an Identification (ID) of the IoT tag 110. The ID is a unique identifier (ID) of the IoT tag 110 created during production of the IoT tag 110. The data packets sent by the IoT tag 110 are received at the user device 120, which in turn, periodically sends the data packets to the server 140. An example embodiment of the user device 120 is illustrated in FIG. 4. The user device 120 include a BLE communication card 450 and a Network Interface Card (NIC) 420, the BLE card 450 communicates with the IoT tag 110 over a BLE network (not shown), while the NIC 420 allows communication with the server 140 over the Internet (not shown), or other type of network.

In an embodiment, the user device 120 may be installed with an agent 125 executed by the processor and stored in the memory of the device 120. The agent 125, when executed, is configured to control the communication with the IoT tag 110 and the server 140. The agent 125 is also configured to receive an interference event caused by the placement of the product 150 proximate to the IoT tag 110. Such an event is received by the server 140 and displayed as notification on a display 460. For example, when a bottle of wine is placed proximate the IoT tag 110, then a notification including information about the wine will be displayed. The agent 125 may include an application (such as a mobile application, a native application, etc.), firmware, or any piece of code executed by the device 120.

In an embodiment, the agent 125, when executed, may access the camera 160 within the user device 120 and use the information gathered from the server 140 for a contextual search. Identifying the product based on the image captured by the camara 160 may be performed by standard computer vision techniques includes in the user device. When a match is found between the information including the metadata of the product 150 and the product 150 within the FOV of the camera 160, an interface may be created and overlaid over the FOV of the camera 150 and displayed on the display 460, via augmented reality. That is, the matching product 150 may be highlighted with a colored line encircling the product 150 within the FOV, as described in more detail in FIG. 2 below.

The combination of identifying the product 150 within the FOV of the camera 160, and the identifying of the product 150 by the IoT tag is mutually synergistic in identifying the product 150. In an embodiment, the application may use the identification information from the IoT Tag 110 to narrow down the search scope in an image database whether located in locally in the user device 120 or the server 140 on the cloud-based platform 130. At the same time, the application may use computer vision by identifying the product 150 within the FOV of the camera 160 to further filter out detected IoT tags 110 that point to products 150 that do not match with the information received from the server that describes the product's various attributes, (e.g., color, aspect ratio, geometry of the product 150) within the FOV.

It should be noted the processor 470 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 480 may be volatile (e.g., RAM, etc.), non-volatile (e.g., ROM, flash memory, etc.), or a combination thereof. The agent 125 (or application) are realized in software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processor 470, cause the execution of the agent 125 over the processor 470.

The server 140 is configured to process the data packets sent from the IoT tag 110 and relayed by the user device 120. In an embodiment, the IoT tag 110 may be pre-programmed to uniquely identify each product 150 by having a unique code assigned for each product 150. Therefore, the data packet may include this unique code identifying the product 150. In an embodiment, the data packet may include an ID of the respective IoT tag 110 and information to be displayed. Based on the data packet, the server 140 retrieves information associated with the product 150, either within the server 140, or elsewhere over the cloud-based platform 130.

The information may include additional descriptions associated with the product, such as metadata, and may have a hierarchical structure in object notation form that are grouped in categories. For example, the categories may include Stock Keeping Unit (SKU), form factor, product class, color, physical dimensions, ingredients, manufacturing origin and date, tracking information along the supply-chain, relative position to other recognized objects (e.g., objects that are not singular and can be only found in boxes or containers), sensor data including temperature, material makeup, and other data that describe the product 150. The information may be stored on the server 140 on the cloud computing platform 130 that provides a web service and may be retrieved based on the hint given by the ID of the respective IoT tag and sent from the server 140 to the user device 120.

For example, a high-level class description for a bottle of wine may be "wine" with a subclass of "red wine" or "750 ml" and a serial number of "3276yu6." In an embodiment, as will be described in detail, a computer vision engine may be provided in the user device 120 that combines the gathered information from the IoT tag 110 and the server 140 with an image of the product 150 within the FOV of the camera 160 to identify the product 150.

Figure 2:
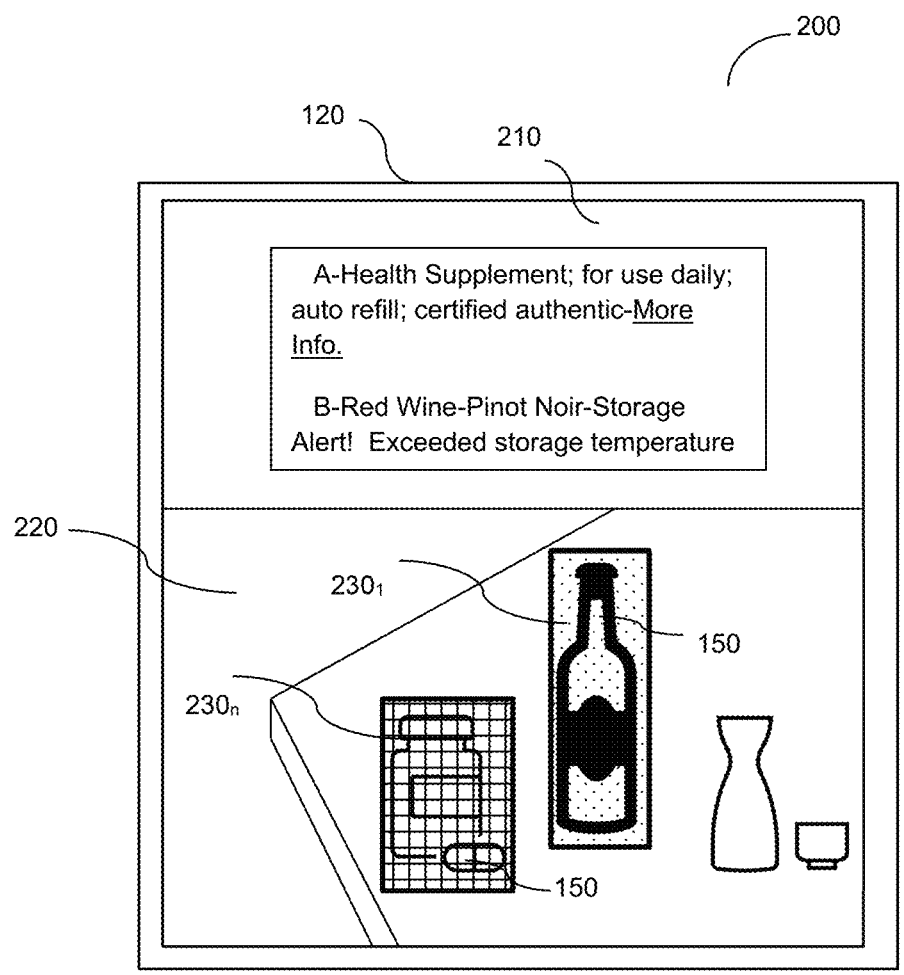
FIG. 2 is a schematic diagram of the wireless lower-energy augment reality viewer interface within the user device, according to an embodiment.

FIG. 2 is a schematic diagram of the lower energy Augment Reality (AR) viewer interface 200, according to an embodiment. The AR viewer interface 200 may be located on a display of the user device 120, with an upper part 210 and a lower part 220. The upper part 210 include information that describe the product 150 may be displayed, while the lower part 220 include the products 150, and highlights 230 1-n (collectively referred to as a highlight 230 or highlights 230).

As discussed previously regarding FIG. 1, the AR viewer interface 200 is overlaid over the FOV of the camera 160 and displayed on the display 460, via augmented reality. That is, the product 150 within the lower part 220 of the AR viewer interface 200 that matches with the product 150 identified by the IoT tag 110 may be highlighted with a colored line encircling the product 150 within the FOV. Once highlighted, the product 150 that is displayed may then be selected by a user to further reveal relevant product information that is retrieved from the server 140 over the cloud-based platform 130. That is, the application may be executed within the user device 120 to render the meta-data objected information retrieved form the server 140 on the upper part 210 of the AR viewer interface 210, starting with the lowest level object notation hierarchy.

In an embodiment, the AR viewer interface 200 triggers product-consumer interaction through an explicit action taken by the user, who confirms the engagement through consent. Also, the AR viewer interface 200 may be configurable by the user, including the layout arrangements. Additionally, the user may be able to further tag the selected product 150 and send a notification to the user's social media account for display from the user device 120, if the metadata information retrieved from the server 140 indicates that the item is discounted at a store.

In an embodiment, the meta-data information may further include a digital certificate, or other indication of product authenticity. To enable the seal of product authenticity, a private and encrypted format for low-energy beacon (e.g., secure low energy URL) may be defined on the cloud-based platform 130 to conduct resolution of the information from the IoT tag 110, decryption, and re-direction, the details of which are beyond the scope of the present application.

The agent 125 may additionally include supporting plug-in scripts configure to communicate with authentication performed by the server 140 to retrieve relevant meta data information of the product 150. Such plug-in scripts, when executed, can filter non-relevant beacons from the IoT Tags 110, such as those where the corresponding product 150 does not appear in the FOV of the camera 160.

In an embodiment, the application may include a computer vision engine that processes the meta-data information retrieved from the server 140, filters out non-relevant beacons from the IoT tags 110, identifies the product 150 within the FOV of the camera 160, gather additional visual information form the camera 160 only when a match is found between the beacon of the IoT tag 110 and the product 150 identified within the FOV of the camera 160. The FOV of the camera 160 is then displayed on the display 460 of the user device 120 along with the relevant information of the product 150 and links overlaid with the FOV on the AR viewer interface 200.

In an embodiment, products 150 attached with the IoT tag 110 may include a bottle of Supplement A and a bottle of wine B on a table. Once the application identifies these two products 150 as the bottle of health supplement and the bottle of wine within the FOV of the camera 160, highlights 230 are placed around these products 150, as opposed to the sake bottle and cup, which are not tagged. Upon selection of both products by the user, the application may then retrieve from the server 140 and reveal the information of the supplement A and wine B including the product history, source of the products, etc. Here, health supplement may include directions on use, refill information, certification of authenticity, and links to more information for the user to select. For the wine B, the type of wine (red), subgroup of red wine "plot noir," temperature condition for the storage of the wine, and links to more information may be displayed at the upper part 210 of the AR viewer interface 200. Additionally, the links may further point to digital assets such as videos, instruction manuals, subscription or other contents and attributes that may be accessed starting from user's selection of the products 150 highlighted by the application.

Figure 3:
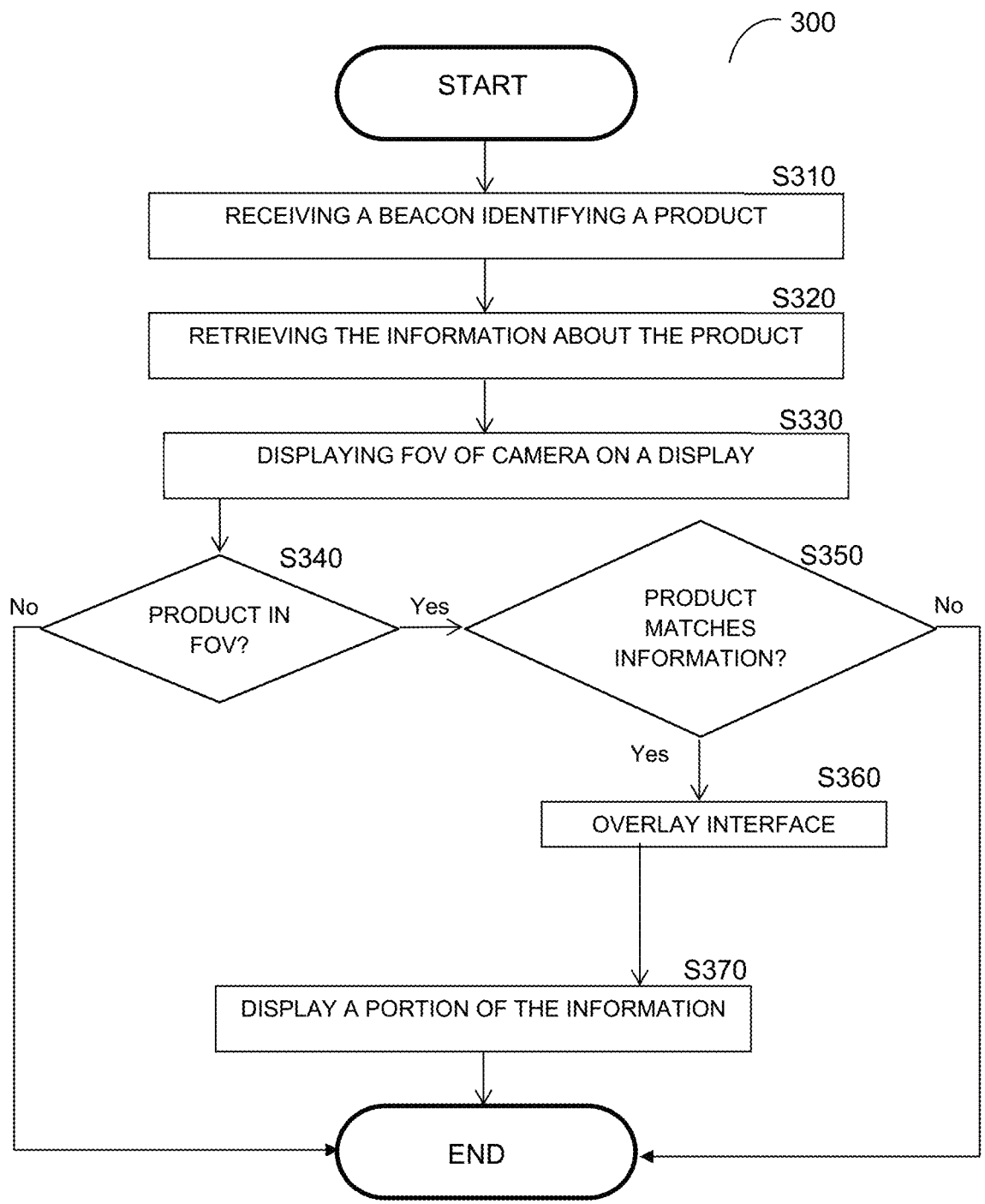
FIG. 3 is a flowchart for a method of providing augmented reality viewing, according to an embodiment.

FIG. 3 is an example flowchart 300 for a method of providing AR for products attached with wireless low-energy tags according to an embodiment. At S310, a low-energy beacon is received from a tag attached to a product. The low-energy beacon uniquely identifies the product. In an embodiment the received beacon is an encrypted and private Bluetooth low energy (BLE) Advertising PDU beacon.

Then, at S320, information about the product identified by the low-energy beacon is received, based on the received low-energy beacon. The information may be received from a server (e.g., server 140, FIG. 1). In an embodiment, the information including meta-data of the identified product. The server may decrypt may authenticate and decrypt the received beacon to provide a security layer.

Next, at S330, the field of view of the camera is displayed on a display which may be located on the user device user device.

At S340, it is determined whether the product is present in an FOV captured by a camera of the user device. Upon determining that the identified product is present in the field of view of the camera user device, the method moves to S350. Otherwise, the method ends.

At S350, it is determined if an object shown in the FOV matches with the retrieved information. If so, the method proceeds to S360. Otherwise, the method ends. In an embodiment, S350 may include processing an image captured by the camara to identify at least one identifier of the product (e.g., product name). If such at least one identifier matches an identifier includes in the retrieved information, then there is a match, At S360, the identified object is highlighted as a product. This may include by overlaying a border around the product. Next, at S370, the information (or portion thereof) of the product is also displayed, which may occur upon additional selection of the highlighted product by the user.

Figure 5:
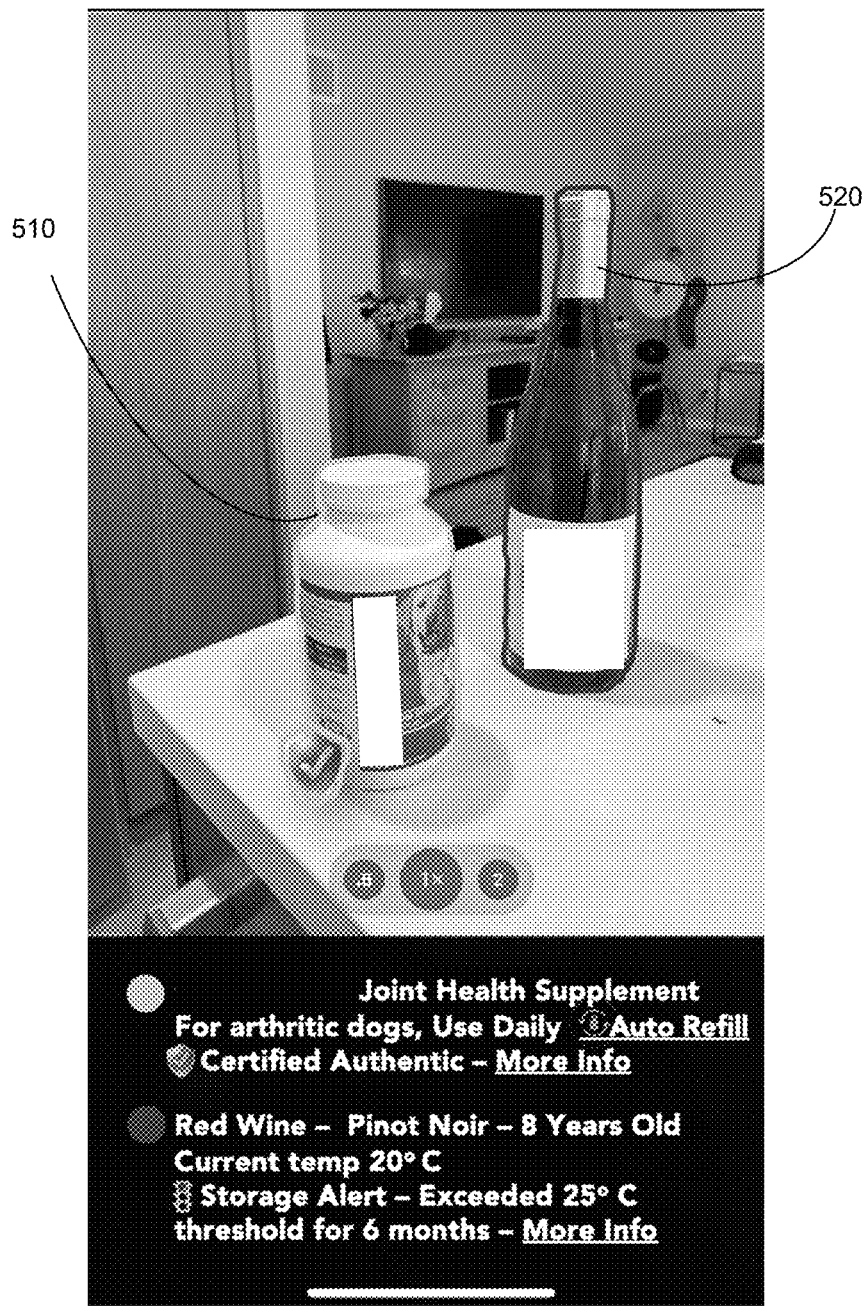
FIG. 5 is a screenshot showing a display rendered on a user device, according to an embodiment.

An example screenshot 500 showing a display rendered on a user device is provided in the FIG. 5. Two products are shown the screenshot 500: a supplemental drug bottle 510 and a wine bottle 520, each is highlighted with a with respective board. The information associated with each product is displayed in a window 530. Such information is retrieved from the server in response to a beacon received from the IoT tag.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

All examples and conditional language recited herein are intended for pedagogical purposes to aid the reader in understanding the principles of the disclosed embodiment and the concepts contributed by the inventor to furthering the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for providing an augmented reality tag viewer, comprising:
   receiving, by a device, a low-energy encrypted radio frequency beacon from a tag attached to a product, the beacon uniquely identifies the product;
   retrieving, by the device from a source other than the beacon, for the product identified by the received beacon information other than global positioning system (GPS)-type information that provides at least one additional description of a characteristic related to the nature of the product itself;
   determining if the product is present in a field of view of a camera of the device;
   upon determining that the identified product is present in the field of view of the camera, matching the product in the field of view of the camera with the retrieved information; and
   upon determining that the product in the field of view matches the retrieved information, overlaying an interface over a display of the device showing the field of view of the camera that includes an image of the product being currently captured by the camera to highlight the product.

2. The method of claim 1, further comprising:
   displaying the field of view of the camera on a display.

3. The method of claim 2, wherein the retrieved information includes metadata on the identified product.

4. The method of claim 1, wherein the tag is at least a wireless low-energy tag.

5. The method of claim 1, wherein the tag is at least a wireless low-energy battery less tag that communicates with the device using a low-energy communication protocol.

6. The method of claim 5, wherein determining if the product is present in a field of view of a camera of the device is performed by an image search of the field of view of the camera using a database and wherein retrieved information about the product identified by the received beacon is employed to narrow a scope of the image search in the image database.

7. The method of claim 6, wherein the low-energy communication protocol is at least a Bluetooth low energy (BLE) protocol and wherein the beacon is an encrypted and private Bluetooth low energy advertising protocol data unit (PDU).

8. The method of claim 1, further comprising:
relaying the received encrypted beacon to a server to authenticate and decrypt the received encrypted beacon, wherein the server is separate from the device; and
retrieving the information about the product from the server.

9. The method of claim 1, wherein the retrieved information includes information about not only to the particular product attached to the tag but also information that relates to at least one other substantially identical such product.

10. The method of claim 1, wherein the tag has a unique identity that is only for itself.

11. A non-transitory computer readable medium having stored thereon instructions for causing a processing circuitry to perform a process, the process comprising:
receiving, by a device, a low-energy encrypted radio frequency beacon from a tag attached to a product, the beacon uniquely identifies the product;
retrieving, by the device from a source other than the beacon, for the product identified by the received beacon information other than global positioning system (GPS)-type information that provides at least one additional description of a characteristic related to the nature of the product itself;
determining if the product is present in a field of view of a camera of the device;
upon determination that the identified product is present in the field of view of the camera, matching the product in the field of view of the camera with the retrieved information; and
upon determining that the product in the field of view matches the retrieved information, overlaying an interface over a display of the device showing the field of view of the camera that includes an image of the product being currently captured by the camera to highlight the product.

12. The non-transitory computer readable medium of claim 11, wherein the retrieved information includes information about not only to the particular product attached to the tag but also information that relates to at least one other substantially identical such product.

13. A system for providing an augmented reality tag viewer, comprising:
a processing circuitry; and
a memory, the memory containing instructions that, when executed by the processing circuitry, configure the system to:
augmented reality tag viewer, comprising:
receive, by a device, a low-energy encrypted radio frequency beacon from a tag attached to a product, the beacon uniquely identifies the product;
retrieve, by the device from a source other than the beacon, for the product identified by the received beacon information other than global positioning system (GPS)-type information that provides at least one additional description of a characteristic related to the nature of the product itself;
determine if the product is present in a field of view of a camera of the device;
upon determination that the identified product is present in the field of view of the camera, match the product in the field of view of the camera with the retrieved information; and
upon determination that the product in the field of view matches the retrieved information, overlaying an interface over a display of the device showing the field of view of the camera that includes an image of the product being currently captured by the camera to highlight the product.

14. The system of claim 13, wherein the system is further configured to:
display the field of view of the camera on a display.

15. The system of claim 14, wherein the retrieved information includes metadata on the identified product.

16. The system of claim 15, wherein the tag is at least a wireless low-energy tag.

17. The system of claim 14, wherein the tag is at least a wireless low-energy battery less tag that communicates with the device using a low-energy communication protocol.

18. The system of claim 14, wherein determining if the product is present in a field of view of a camera of the device is performed by an image search of the field of view of the camera using a database and wherein retrieved information about the product identified by the received beacon is employed to narrow a scope of the image search in the image database.

19. The system of claim 18, wherein the low-energy communication protocol is at least a Bluetooth low energy (BLE) protocol and wherein the beacon is an encrypted and private Bluetooth low energy advertising protocol data unit (PDU).

20. The system of claim 13, wherein the system is further configured to:
relay the received encrypted beacon to a server to authenticate and decrypt the received encrypted beacon, wherein the server is separate from the device; and
retrieve the information about the product from the server.

21. The system of claim 13, wherein the retrieved information includes information about not only to the particular product attached to the tag but also information that relates to at least one other substantially identical such product.

* * * * *